United States Patent
Choiniere (10) Patent No.: US 10,197,791 B2
(45) Date of Patent: Feb. 5, 2019

(54) FLUID FILLED BEAM STEERING PRISMS

(71) Applicant: BAE SYSTEMS INFORMATION AND ELECTRONIC SYSTEMS INTEGRATION INC., Nashua, NH (US)

(72) Inventor: Michael J. Choiniere, Merrimack, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 1 day.

(21) Appl. No.: 15/359,699

(22) Filed: Nov. 23, 2016

(65) Prior Publication Data

US 2018/0143425 A1    May 24, 2018

(51) Int. Cl.
*G02B 26/08* (2006.01)
*G02B 26/00* (2006.01)

(52) U.S. Cl.
CPC .......... *G02B 26/08* (2013.01); *G02B 26/004* (2013.01); *G02B 26/0841* (2013.01); *G02B 26/0891* (2013.01)

(58) Field of Classification Search
CPC .......... G02B 26/0841; G02B 26/0833; G02B 26/105; G02B 26/08; G02B 26/004; G02B 26/0891; F21W 2131/406; G03F 7/70291
USPC .......................................................... 359/298
See application file for complete search history.

(56) References Cited

U.S. PATENT DOCUMENTS

| | | | | |
|---|---|---|---|---|
| 3,489,486 A | | 1/1970 | De La Cierva | |
| 3,514,192 A | * | 5/1970 | De La Cierva | G02B 5/06 359/557 |
| 5,589,239 A | * | 12/1996 | Tomono | G02B 27/646 348/E5.046 |
| 5,796,531 A | * | 8/1998 | Kaneda | G02B 27/646 359/557 |
| 2014/0168793 A1 | * | 6/2014 | Fukino | G02B 7/102 359/704 |
| 2014/0240810 A1 | | 8/2014 | Sapir | |

OTHER PUBLICATIONS fao.org: Polydimethylsiloxane FAO. Web. Feb. 20, 2018 < http://www.fao.org/ag/agn/jecfa-additives/specs/Monographl/Additive-315.pdf>.*

* cited by examiner

*Primary Examiner* — Bumsuk Won
*Assistant Examiner* — Henry A Duong
(74) *Attorney, Agent, or Firm* — Davis & Bujold, PLLC (57) ABSTRACT

The system and method of steering a beam using in-line fluid filled prisms having a first transparent plate, a second transparent plate, and a fluid layer interposed between the first and second plate. One or more actuators are used to manipulate the first and second plates relative to each other to create a prism to steer a beam. A second fluid filled prism may be used in-line, where one prism is used for fine adjustment and the other prism is used for coarse adjustment.

15 Claims, 7 Drawing Sheets

FLUID FILLED BEAM STEERING PRISMS

FIELD OF THE DISCLOSURE

The present disclosure relates to steering beams of light and, more particularly, to the use of a fluid filled prism to steer laser beams.

BACKGROUND OF THE DISCLOSURE

There are many applications in which a laser must be steered in an accurate and controllable way or manner. This controlled steering of lasers has applications in 3D object scanning, LIDAR, and other methods of capturing the distance and the shape of objects. In other applications, there is a need to accurately deflect a laser beam for materials processing, laser printing, medical applications, as well as a number of other applications.

Figure 1A:
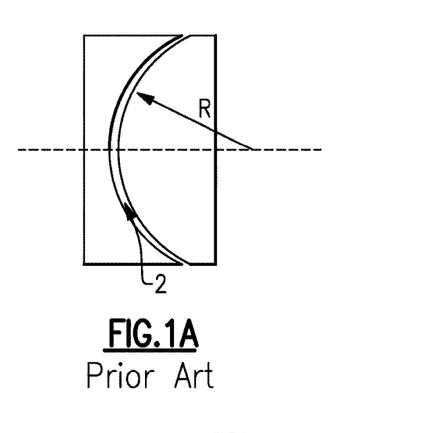
FIG. 1A-FIG. 1B show traditional nesting optics used for beam steering.

Steering a laser typically requires steering mirrors, lenses, or rotating Risley prism pairs; these methods tend to be expensive and require large amounts of volume and/or weight. Currently, there are many methods for steering a. beam or a laser (e.g., an optical boresight), but all suffer from the associated weight, volume, and/or cost issues. For example, one conventional method of adjusting a laser's direction uses rotating nesting optics, as seen, for example, in FIGS. 1A and 1B. These nesting optics provide a very accurate way to make direct azimuth and elevation adjustments, for example, but they are quite large and heavy and suffer from vibrational interference. In addition, an index matching fluid 2 is present between the optics to facilitate smooth movement.

Figures 1B, 1D:
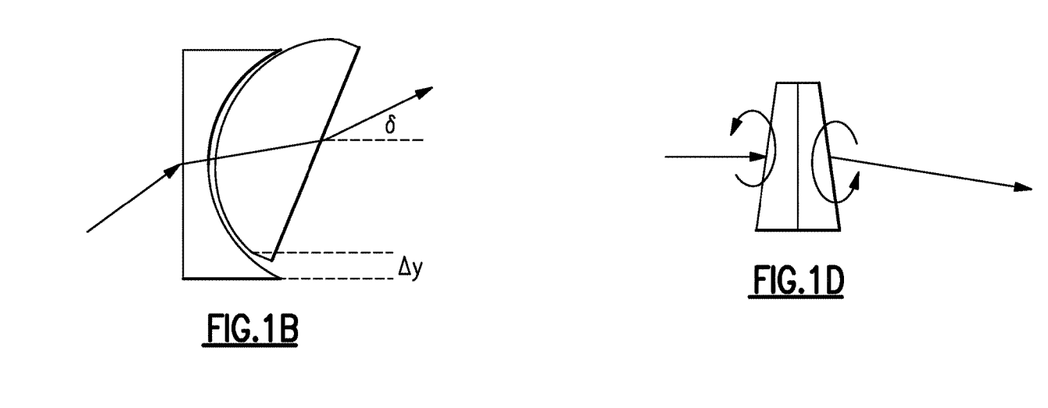
FIG. 1C-FIG. 1D show a Risley prism pair in a first orientation (FIG. 1C) with no beam divergence and a second orientation (FIG. 1D) with beam divergence.
Figure 1C:
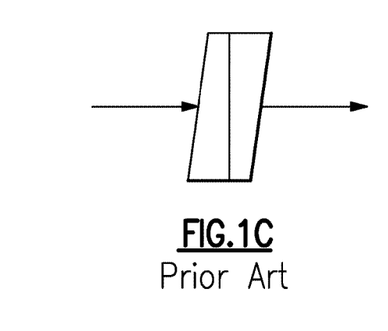

Another example of current laser steering technology is a Risley prism pair, as seen, for example, in FIGS. 1C and 1D. These prism pairs are typically aligned in the factory, but are often difficult to scan in the field since they do not use orthogonal movement, but rather polar coordinates. Scanning about the optical centerline regenerates singularities in the scan pattern typically requiring a third wedge to simplify the scanner motion.

Risley prism pairs consist of two angled wedge prisms that are rotatable with respect to each other essentially along the axis of the beam. Both wedges require independent adjustment to provide the full range of angles of divergence available for the system. Rotating one wedge in relation to the other will change the direction of the beam. When the wedges' angles are oriented in the same direction, the angle of the refracted beam becomes greater, as shown in FIG. 1D. When the wedges are rotated to orient the two wedged angles in opposite directions (e.g., the thick edge of a first prism faces in one direction and the thick edge of a second prism faces in the other opposite direction to form a parallelogram), the prisms cancel each other out, and the beam is allowed to pass straight through the Risley prism pair, as shown in FIG. 1C. Risley prism pairs provide indirect azimuth and elevation adjustments and use polar coordinates. They can be particularly difficult to adjust for slightly off center.

Figure 1E:
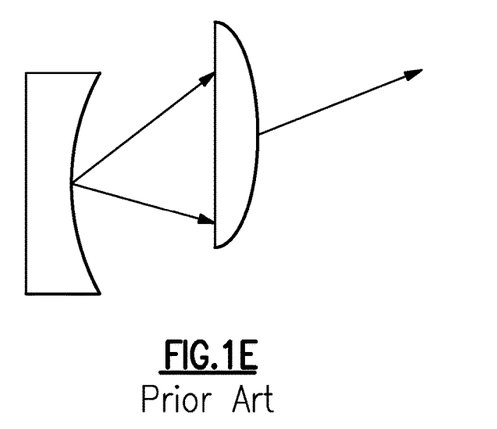
FIG. 1E shows the use of radial displacement of lenses in a prior art system.
Figure 1F:
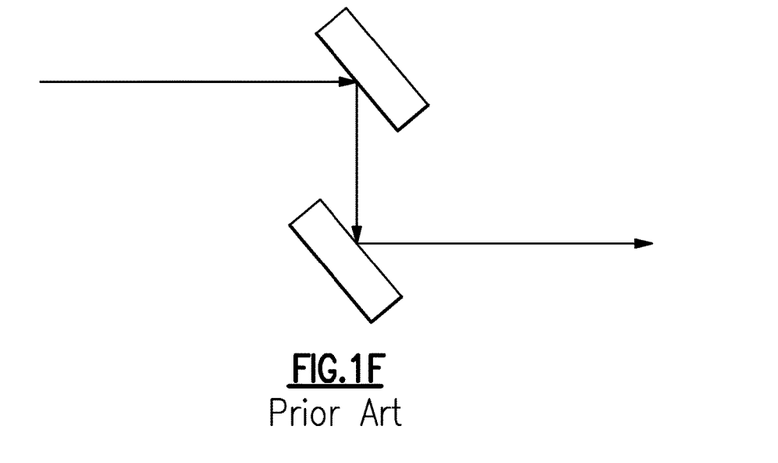
FIG. 1F shows the traditional method of using orthogonal minors to steer a beam.

Yet another current method of beam steering uses radial displacement with lenses (See, for example, FIG. 1E). This method uses traditional azimuth and elevation adjustment, and is used with larger optics. Lastly, pairs of mirrors have been used, as seen, for example, in FIG. 1F. The two mirrors are typically placed orthogonal to each other and they are spaced apart. This system requires large volumes within a device.

In contrast to the existing methods, it is desirable to have an improved system and method which utilizes minimal space and is both lightweight and inexpensive. In addition, the improved system and method will dynamically form an optical wedge with a variable prism having the correct angular offset and direction for the beam deflection.

SUMMARY OF THE DISCLOSURE

Wherefore it is an object of the present disclosure to overcome the above mentioned shortcomings and drawbacks associated with the prior art systems and methods of steering lasers.

One aspect of the present disclosure is a beam steering system, comprising a first transparent plate having an inner and a leading surface; a second transparent plate having an inner and a trailing surface; a transparent fluid layer interposed between the inner surface of the first plate and the inner surface of the second plate; and at least one actuator(s) for manipulating the first and second plates relative to each other to steer a beam as the beam passes through the first transparent plate, the transparent fluid layer, and the second transparent plate.

One embodiment of the beam steering system is where the first and second transparent plates are made of glass and the transparent fluid layer is contained within a pliable transparent polymer sack.

Another embodiment of the beam steering system is where the transparent fluid layer comprises a polydimethylsiloxane fluid having a refractive index ranging from about 1.375 to about 1.390.

In some cases, the one or more actuator(s) is/are piezoelectric actuators. In certain embodiments, the one or more actuator(s) comprise three spaced apart actuators.

The prism can steer the laser beam within a conical field of regard by about δ degrees depending on the wedge angle α, the wavelength, and the fluid refractive index. In some embodiments, the beam is an optical beam incident upon the outer surface the first transparent plate, wherein the optical beam travels enters the leading surface of the first transparent plate, passes through the fluid layer, and exits from the trailing surface of the second transparent plate. In certain cases, an incident angle of the optical beam at the leading surface of the first transparent plate is different than an exit angle at the trailing surface of the second transparent plate.

Another aspect of the present disclosure is a beam steering system that further comprises a third transparent plate having an inner and leading surface; a fourth transparent plate having an inner and a trailing surface; a second transparent fluid layer interposed between the inner surface of the third plate and the inner surface of the fourth transparent plate; and at least one actuator for manipulating the third and the fourth plates relative to each other to steer a beam by passing the beam through the third transparent plate, the second transparent fluid layer, and the fourth transparent plate.

One embodiment of the beam steering system is wherein the third and the fourth transparent plates are made of glass and the second transparent fluid layer is contained in a transparent polymer sack.

Another embodiment if the beam steering system is wherein the second transparent fluid layer comprises a polydimethylsiloxane fluid having a refractive index ranging from about 1.375 to about 1.390.

In some cases, the one or more actuators are piezoelectric actuators.

Yet another aspect of the present disclosure is a method of steering a beam comprising, providing a first transparent plate having an inner and a leading surface; providing a second transparent plate having an inner and a trailing surface; interposing a transparent fluid layer between the inner surface of the first plate and the inner surface of the second plate; coupling at least one of the first plate and the second plate to at least one actuator to facilitate movement thereof; operating the at least one actuator to manipulate the first and second plate relative to each other to create a prism; and passing a beam through the first transparent plate, the transparent fluid layer, and the second transparent plate to steer the beam.

One embodiment of the method of steering a beam is wherein the transparent plates are made of glass and the transparent fluid layer in contained by a transparent polymer sack.

Another embodiment of the method of steering a beam further comprises using a polydimethylsiloxane fluid, having a refractive index ranging from about 1.375 to about 1.390, as the fluid layer.

In certain cases, the method further comprises using piezoelectric actuators as the at least one actuator. The method of steering a beam further comprises steering, via the prism, the beam within a conical field of regard by about δ degrees depending on a wedge angle α, a wavelength, and a fluid refractive index.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

Typically, lasers are steered using mirrors, lenses, or Risley prisms. These methods tend to be expensive, heavy, and require a large amount of volume within the device. In contrast to the existing systems and methods, the system and method of the present disclosure occupies minimal space and is both lightweight and inexpensive. The approach is to dynamically form an optical wedge with a variable prism having the correct angular offset and direction for the beam deflection.

Figure 2A:
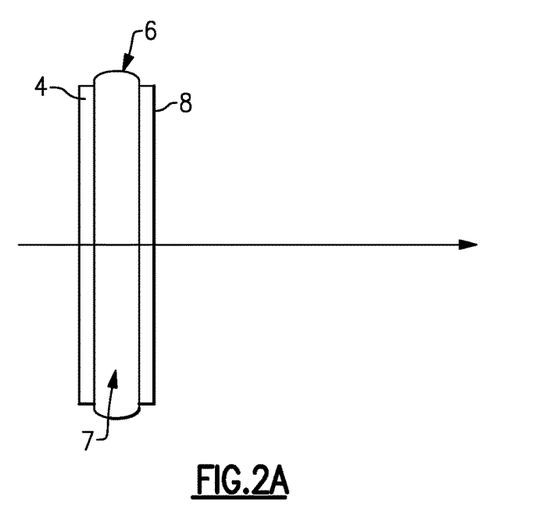
FIG. 2A shows a first orientation of one embodiment of the fluid filled beam steering prisms of the present disclosure without any beam divergence.
Figure 2B:
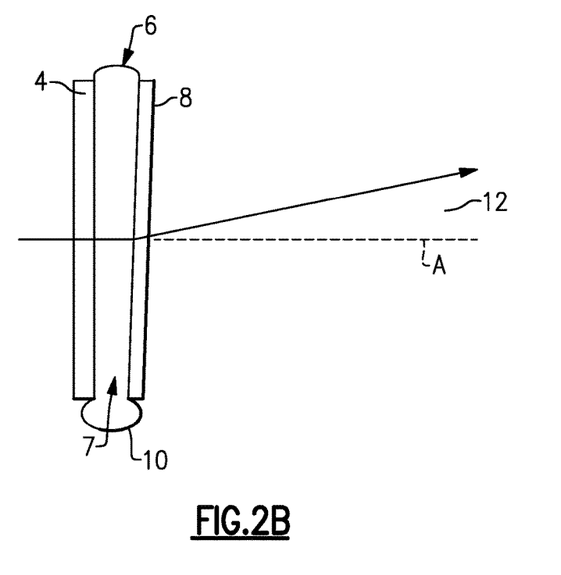
FIG. 2B shows a second orientation of one embodiment of the fluid filled beam steering prism of FIG. 2A of the present disclosure with beam divergence.

Turning now to FIGS. 2A and 2B, the method and system of the present disclosure is accomplished by using first and second transparent plates 4, 8 that sandwich a compliant optical fluid 7, contained by a transparent optical polymer sack 6, therebetween. As the wedge angle formed by the two plates 4, 8 changes, the shape of the sack 6 of optical fluid 7 correspondingly changes and fills any voids resulting as the first and second plates move with respect to each other and alters the shape of the beam steering prism. In some embodiments, the sack 6 of optical fluid 7 is the same material currently being used for lenses that change shape for focus adjustment. The sack 6 is made of a transparent material so as to permit the beam to make one complete pass through each of the first plate 4, the fluid 7, the sack, and the second plate 8 during operation of the beam steering system of the present disclosure. The sack may completely envelope the optical fluid and that fluid filled sack may be sandwiched between two plates. In this case, the beam would pass through a first plate, an incident leading layer of the polymer sack, the optical fluid, a trailing exit layer of the polymer sack, and a second plate. See, for example, at least FIG. 2A and FIG. 2B. In certain embodiments of the present disclosure, the first and second transparent plates 4, 8 are biased toward one another so that the surface of the sack 6 is normally slightly compressed therebetween.

In other embodiments, the fluid may be retained between the two plates by a polymer sack that seals the two plates together around the periphery of the two plates, such that the beam will pass through the first plate, the optical fluid, and the second plate but no polymer layers. See, for example, at least FIG. 5. In either embodiment, the polymer sack must be sufficiently elastic to accommodate the expansion and relaxation along the boundary of the plates as the plates are moved relative to each other to steer the beam.

This beam steering solution is simpler and requires less volume and weight to implement than existing beam steering systems. This system and method are an in-line approach and can be made compact and at a very low cost. In some examples, the focusable prism using compliant fluid, as described herein, currently costs about $100 and has the potential of performing at (high) bandwidths of about 200 to 300 Hz. In some cases, the apertures are about 1 to 2 inches while providing between 1 to 5 degrees of steering.

The beam steering system and method of the present disclosure allows for in-line optical beam steering. In some embodiments, the frequency response (e.g., 1-100 Hz) and high angle response (e.g., +/−0.1-5 degrees) eliminates high cost, large mirrors while reducing the steering mirror volume by 5 to 10x. It is to be appreciated that this technology could be applied to lasers, cameras, or any optical system where scanning or alignment is needed.

Referring to FIG. 2A, a first orientation of one embodiment of the fluid filled beam steering prisms of the present disclosure is shown. More particularly, the system comprises a first transparent plate 4 and a second transparent plate 8, with a transparent polymer sack 6 containing a compliant fluid 7 interposed between the first and the second transparent plates 4, 8. In some embodiments, the plates are made of glass. It is to be appreciated that a variety of different materials can be used for the plates, such as glass, plastic, or any optical material that is transparent to the operating band of the system and provides sufficient structural stiffness to prevent bowing or deflection of the plate under the vibrational load induced by the changing wedge angle. A suitable optical coating(s) can be applied to the exterior of the wedge surfaces to increase transmission and, accordingly, an interior coating(s) may or may not be required depending on the material form which the plate is manufactured, the index of the optical fluid, the wavelength of the optical system and the acceptable system transmission loss.

Referring to FIG. 2B, a second orientation of the fluid filled beam steering prisms of FIG. 2A is shown. More particularly, the system has the first transparent plate 4 and the second transparent plate 8 and the polymer sack 6 containing the compliant fluid 7 interposed between the first and the second transparent plates 4, 8 which can be used to create a controlled beam divergence angle 12 (angle $\delta$) relative to a central axis A of the fluid filled prism system 20 which does not provide any beam deflection of the beam 18 when the plates 4, 8, are in a coplanar position. In FIG. 2B, the central axis A is understood to be coincident with the incident beam.

According to one example, the second plate 8 is moved in such a way as to compress the fluid-filled sack 6 in one area so the sack bulges out, generally indicated as element 10, from the peripheral edges of the first and the second transparent plates 4, 8 in the region where the plates 4, 8 are compressed or moved toward one another. In some cases, the plates 4, 8 are rigid and planar. It is to be appreciated that the plates 4, 8 may have the same thickness or, for some applications, the plates 4, 8 may have different thicknesses from one another.

Figure 3:
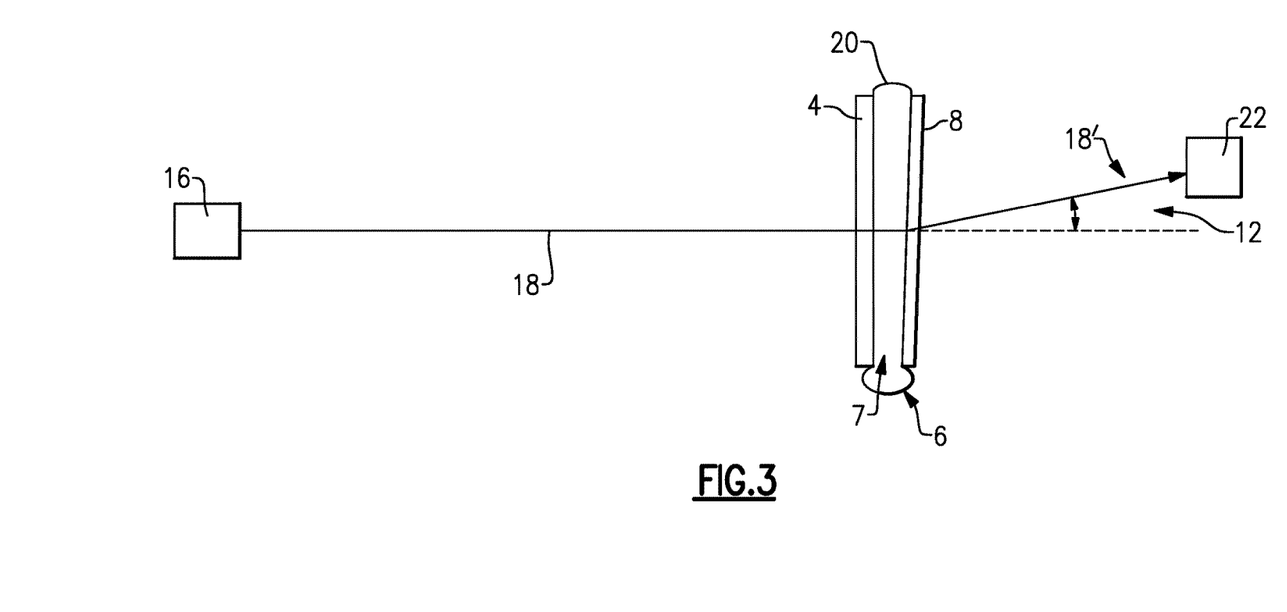
FIG. 3 is a diagram of one embodiment of the system of the present disclosure.

FIG. 3 is a diagram of one embodiment of the system of the present disclosure. There, a laser source 16 produces a laser beam 18 that is directed through a fluid filled prism system 20 of the present disclosure and the beam is diverted at a desired beam divergence angle 12, by the fluid filled prism system 20, to a target 22. More particularly, the laser source generates a laser beans 18 that passes completely through the first transparent plate 4, a first surface of the transparent sack 6, the compliant fluid 7, a second opposed surface of the transparent sack 6 and the second transparent plate 8 for propagation toward the target 22. Either one or both of the transparent plates 4, 8 are movable, relative to one another, in order for the fluid filled prism system 20 to be adjusted into the desired prism shape which will divert the resultant beam 18', exiting from the fluid filled prism system 20, by the desired beam divergence angle into precise alignment with a target of interest 22.

Figure 4A:
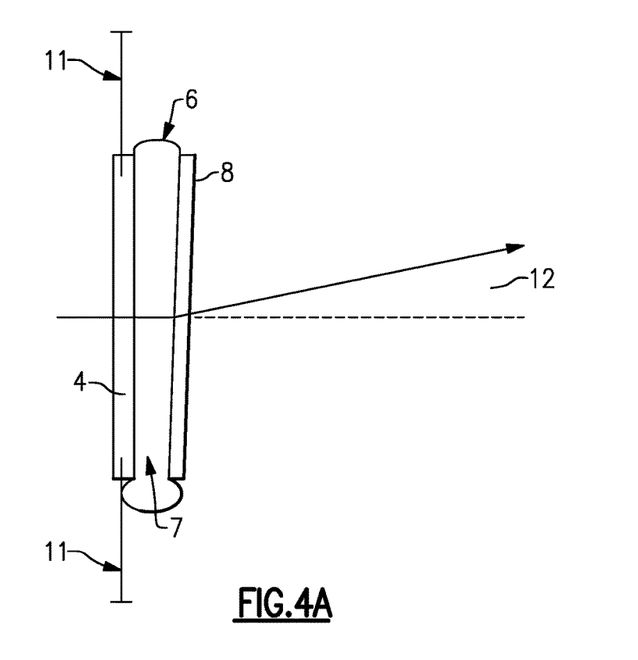
FIG. 4A shows one embodiment of the fluid filled beam steering prisms of the present disclosure.

FIG. 4A shows another embodiment of the fluid filled beam steering system of the present disclosure. There, the first transparent plate 4 is stationary or fixed and is mounted 11 to constantly remain in the same position during operation of the fluid filled beam steering system 20 while only the second transparent plate 8 is tilted/adjustable with respect to the first transparent plate 4 in order to modify the shape of the fluid filled beam steering system 20 and produce a desired prism shape that creates the resultant controlled beam divergence 12 (i.e., angle $\delta$). A prism is created when the relative position of the two plates creates a wedge and compresses the sack 6 filled with compliant fluid 7. In this embodiment, a plurality of actuators 14 are coupled or placed about the periphery of the second transparent plate 8 and are used to induce a range of motion for the second transparent plate 8 relative to the first transparent plate 4.

Figure 4B:
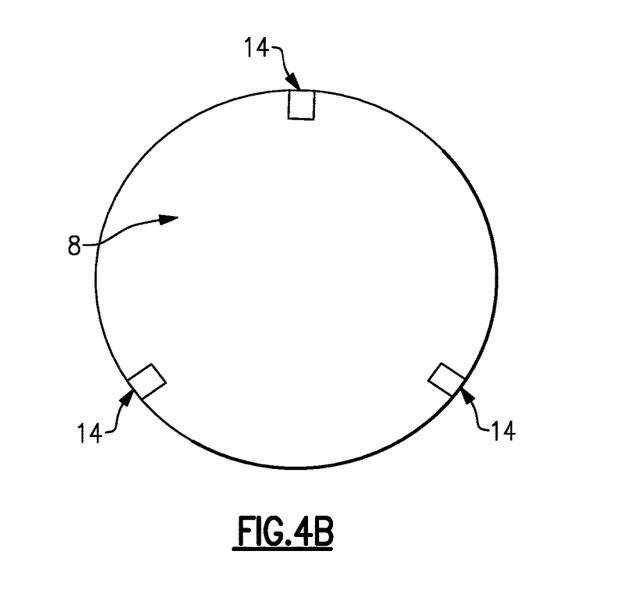
FIG. 4B shows a second view of the fluid filled beam steering prisms of the present disclosure as shown in FIG. 4A.

FIG. 4B shows a front view of the fluid filled beam steering prism of the present disclosure as shown in FIG. 4A. More particularly, the central region of both the first and the second transparent plates 4, 8 are both completely unobstructed so as to allow the beam to pass through. The actuators 14 (the 3 actuators in this instance) are located around the periphery of the second transparent plate 8 (e.g., a cylindrical member in this embodiment) to control the angle and the direction of the resultant beam. It is understood that the first and the second plates 4, 8 could have a variety of other face shapes, square, rectangle, hexagon, etc., as long they each have a pair) of parallel leading and trailing faces.

In certain embodiments, each the first and the second transparent plates 4, 8 have actuators 14 which facilitate moving or adjusting the relative orientations of the first and the second transparent plates 4, 8, relative to each other. In certain cases, three or more actuators 14 are used, per plate, to create the total conical range of motion for divergence of the beam.

Figure 5:
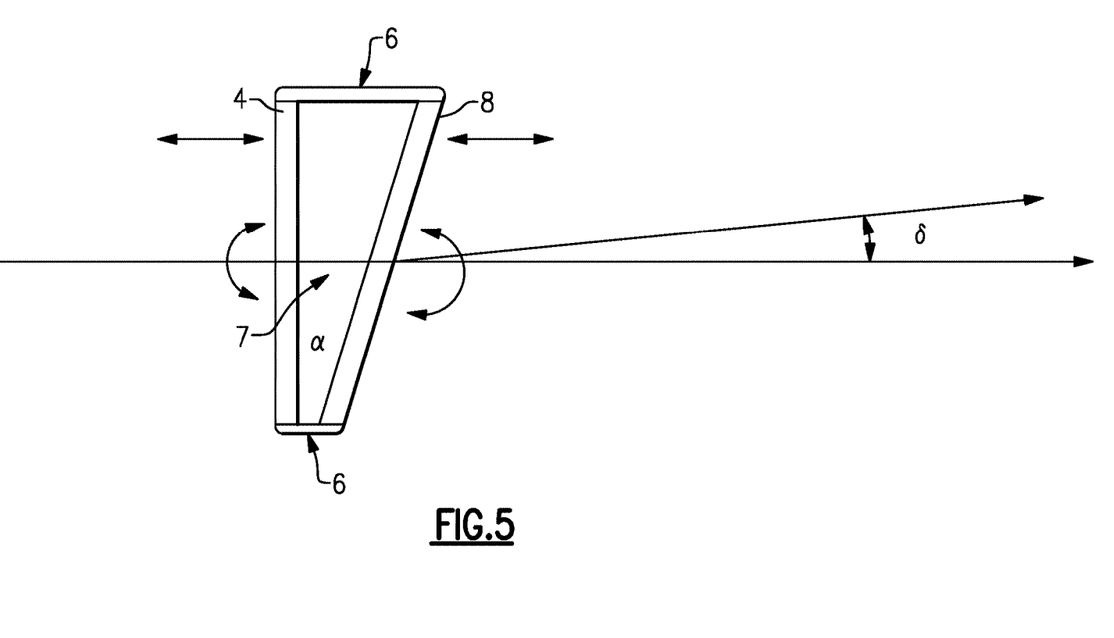
FIG. 5 shows beam divergence with fluid filled beam steering prisms according to the principles of the present disclosure.

FIG. 5 shows beam divergence via a fluid filled beam steering system according to the principles of the present disclosure. As shown in this Figure, a first transparent plate 4 and a second transparent plate 8 are moved relative to each other in order to form a wedge or angle $\alpha$ between a plane comprised of the first transparent plate 4 and a plane comprised of the second transparent plate 8. The arrows, in this Figure, are used to diagrammatically represent that each one of the transparent plates has full range of motion to create a conical range of motion for divergence of the beam. As with the previous embodiments, a compliant fluid 7 interposed between the two plates 4, 8 and sack 6 (shown here sealing the boundaries of the plates). A beam 18 passing through the fluid filled prism system 20 has a resulting controlled beam divergence 12 (i.e., angle $\delta$).

In one embodiment, the first and the second transparent plates 4, 8 are about 2 mm thick and made of glass. The beam has a wave length of about 532 nm and the optical fluid has a refractive index of n=1.377. The thickness of the plates and the thickness of the fluid do not impact the calculation of beam divergence angle 12 ($\delta$). It is to be appreciated that only the angle ($\alpha$) formed by the intersecting planes comprised by the two plates, influences the amount of beam steering achieved by the fluid filled prism system 20. In this example, the compliant fluid of hexamethyldisiloxane with a refractive index of 1.377 and the plates creating an angle, $\alpha$, results in beam divergence $\delta=(n-1)\alpha$.

By using actuators 14 to manipulate at least one of the first and the second transparent plates 4, 8 relative to the other transparent plate 8, 4, a prism is formed. For some applications, one plate 4 or 8 may be stationary or fixed while the other plate 8 or 4 is mounted so as to move relative to the other plate 4 or 8. In some cases, the moving plate is tilted from side to side. This motion is similar to rotating about a longitudinal axis (if the plate has a longer side), and in other cases it is tilted up and down, or along a transverse or lateral axis (again, if the plate has a shorter side). In yet other cases, a combination of tilting motions is used to provide for a conical field of regard within which a beam can be steered. As used herein, tilting should not imply jerking or sporadic motion, but a steady, fluid motion. The term was chosen to demonstrate that the motion of one plate with respect to the other plate is not rotation about the central axis of the fluid filled prism system 20, but an adjustment motion that modifies the orientation of the first and the second transparent plates 4, 8, relative to each other, and, in turn, adjusts the wedge angle α created from the two originally coplanar plates. By forming a prism in this way, a beam traveling through the several layers, e.g., the first plate 4, the compliant optical fluid 7 contained in a sack 6, and the second plate 8, can be diverted within a particular conical range.

In one embodiment, two glass plates sandwich a compliant fluid filled optical medium. As the plates adjust their relative positions to form a wedge in any desired direction, the compliant inner fluid 7 section displaces fluid out past the peripheral edges 10. In some cases, the inner fluid section uses the same type of materials used in generating compliant fluid filled lenses as a focusing method.

In some embodiments, the fluid is a low viscosity silicone fluid. In certain embodiments, the fluid has super low viscosity and is a polydimethylsiloxane fluid ranging in viscosity from about 0.65 cSt to about 2 cSt. In some cases, the fluids have low surface tension (high spreadability), low viscosity-to-temperate coefficients (V.T.C.), low pour points (as low as −100° C.), high dielectric strength, and low molecular weights. The refractive indices of the fluids can range from about 1.375 to about 1.390. Some compliant fluids have thermal expansion ranging from about 0.00115 to about 0.00135 cc/cc° C. and V.T.C. ranging from about 0.3 to about 0.5.

In some embodiments, the compliant fluids have thermal conductivity ranging from about 0.0002 to about 0.0003 g/cal/cm/sec° C. and specific gravity ranging from about 0.75 to about 0.90. Some preferred fluids include, but are not limited to, hexamethyldisiloxane, octamethyltrisiloxane, decamethyltetrasiloxane, dodecamethylpentasiloxane, and the like. The fluids can be matched to the wavelengths of the beam and to the environment where the system will be used.

In certain embodiments of the method and system of beam steering using fluid filled prisms, the prisms are in-line with the beam. In some cases, the beam may be up to 3" in diameter and the prism is sized accordingly. In one example, the method applied to a 1.06 µm laser with a 10 mm collimated beam could use a 15 mm×15 mm×3 mm BK7 plate to form the fluid filled prism. The actual form of the plate, rectangular, circular, other is a byproduct of the actuators and the size of the prism.

The thickness of the fluid is generally defined by the amount of wedge needed to suitably steer the beam. The prism wedge angle and fluid's refractive index defines the extent of steering; thus, the more steering needed the thicker the wedge set or spacing of the plates in the neutral position. Both the first and second transparent plates 4, 8 must apply a small compression or biasing force to the polymer sack 6 filled with the compliant fluid 7 and located therebetween to avoid formation of any air pockets between the polymer sack 6 filled with the compliant fluid 7 and the mating inwardly facing surface or either the first or the second plates 4, 8.

The sack 6 can be formed by multiple materials including polymers, silicon, elastomers, such as rubber and derivatives, and thin walled metal bellows. The selection for the sack 6 is defined by the amount of motion, the internal pressure generated by actuators, and the operating temperature. In laboratory applications with slow motion criteria, a polyester could be utilized and if the application becomes more demanding a thin wall metal bellows might be more appropriate.

In some embodiments, the fluid may be sandwiched between the plates by use of a reservoir etched into one or more of the plates. In a highly dynamic motion between the plates, a reservoir of fluid can be stored along the perimeter of the prism to account for actuator motion resulting in a varying fluid volume between the plates. At motion, bubbles could be generated affecting the optical properties of the wedge. To prevent this, a higher pressure level fluid is needed to move the fluid to fill the varying volume. It is important to minimize cavitation in the fluid layer. In some cases, positive pressure from the fluid layer helps to mitigate the cavitation from generating bubbles which affect the optical properties of the prism.

In some cases, the method of moving the first glass transparent plate 4 relative to the second glass transparent plate 8 and vice versa to produce a prism to steer a beam comprises piezoelectric actuators. These actuators can obtain speeds of about 200 to 300 Hz. Linear actuators may also be used for fast scanning. In one embodiment, a three-legged actuator is used. In all cases of the dynamic wedge angle, one plate can move relative another or they can both move.

In another embodiment of the present disclosure, a second fluid filled prism is used in-line with the first fluid filled prism. There, the first prism is used for coarse adjustment and the second prism is used for fine adjustment. For example, there are applications where both fine (+/−1 mrad) at 100 Hz frequency and coarse motion (+/−10 degrees) at 10 Hz. are needed to point a laser and then stay on a target while mounted on moving vehicle. The coarse motion due to line of sight changes and high frequency due to vibration are needed to stay on target. Trying to combine both high displacement and high frequency becomes problematic for the actuators but is readily solved as a two prism set.

Figure 6:
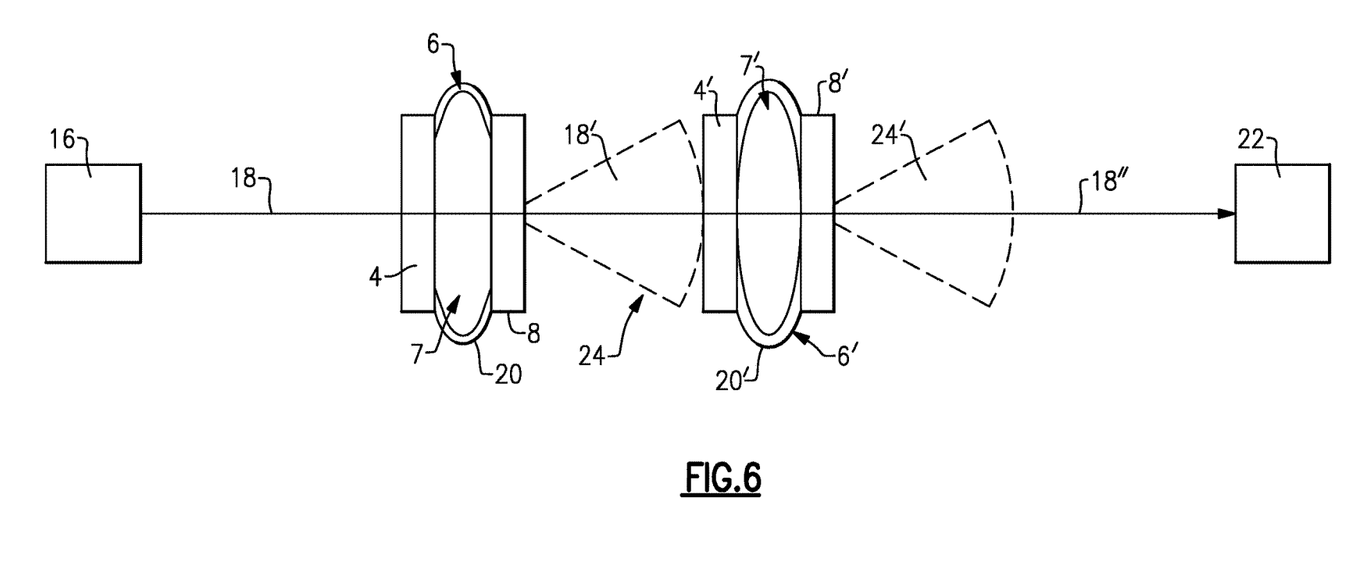
FIG. 6 shows a diagram of a dual fluid filled beam steering system of the present disclosure.

Referring to FIG. 6, a diagram of a dual fluid filled beam steering system is shown. More specifically, a laser source 16 produces a laser beam 18 that is directed through a first fluid filled prism system 20 of the present disclosure. In this Figure, the beam is not diverted as the plates are co planar. The beam is directed through a second fluid filled prism system 20' to a target 22. Each of the fluid filled prism systems can be adjusted to steer the beam within a conical field of regard 24, 24'. In this embodiment, the polymer sack 6, 6' contain the optical fluid 7,7' between the respective pairs of plates. As discussed above, the sack could fully envelope the fluid as a separate component that is then sandwiched between a pair of plates.

Still referring to FIG. 6, the laser source generates a laser beam 18 that passes completely through the first transparent plate 4, the compliant fluid 7, and the second transparent plate 8 for propagation toward the third transparent plate 4', the compliant fluid 7', and the fourth transparent plate 8' for propagation toward the target 22. Either one or both of the transparent plates 4, 8 are movable, relative to one another, in order for the fluid filled prism system 20 to be adjusted into the desired prism shape which will divert the resultant beam 18', exiting from the fluid filled prism system 20, by the desired beam divergence angle into precise alignment with the second fluid filled prism system 20'. Likewise, either one or both of the transparent plates 4', 8' are movable, relative to one another, in order for the fluid filled prism system 20' to be adjusted into the desired prism shape which will divert the incident beam 18' to a resultant beam 18", exiting from the fluid filled prism system 20', by the desired beam divergence angle into precise alignment with a target of interest 22.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A beam steering system comprising:
    a first transparent plate having an inner and a leading surface;
    a second transparent plate having an inner and a trailing surface;
    a transparent fluid layer interposed between the inner surface of the first plate and the inner surface of the second plate, wherein the transparent fluid layer is encapsulated within a transparent polymer sack, the transparent polymer sack having a leading periphery and a trailing periphery, the leading and trailing peripheries abut the inner surfaces of the first and second transparent plates, respectively; and
    at least one piezoelectric actuator for manipulating the first and the second plates relative to each other to steer a beam as the beam passes through the first transparent plate, a leading periphery of the transparent polymer sack, the transparent fluid layer, a trailing periphery of the transparent polymer sack, and the second transparent plate.

2. The beam steering system of claim 1, wherein the first and the second transparent plates are both made of glass.

3. The beam steering system of claim 1, wherein the transparent fluid layer comprises a polydimethylsiloxane fluid having a refractive index ranging from about 1.375 to about 1.390.

4. The beam steering system of claim 1, wherein the at least one actuator comprises three actuators.

5. The beam steering system of claim 1, wherein the beam steering system can steer the laser beam within a conical field of regard by about δ degrees depending on the wedge angle α, wavelength, and a fluid refractive index.

6. The beam steering system of claim 1, wherein the beam is an optical beam incident upon a leading surface of the first transparent plate, wherein the optical beam travels through the fluid layer encapsulated by the transparent polymer sack and exits from the trailing surface of the second transparent plate.

7. The beam steering system of claim 1, wherein an incident angle of the optical beam at a leading surface of the first transparent plate is different than an exit angle at the trailing surface of the second transparent plate.

8. The beam steering system of claim 1, further comprising
    a third transparent plate having an inner and a leading surface;
    a fourth transparent plate having an inner and a trailing surface;
    a second transparent fluid layer interposed between the inner surface of the third plate and the inner surface of the fourth plate;
    a second transparent polymer sack encapsulating the fluid layer, the second transparent polymer sack having a leading periphery and a trailing periphery, the leading and trailing peripheries abut the inner surfaces of the third and fourth transparent plates, respectively; and
    at least one piezoelectric actuator for manipulating the third and fourth plate relative to each other to steer a beam by passing the beam through the third transparent plate, a leading periphery of the second transparent polymer sack, the second transparent fluid layer, a trailing periphery of the second transparent polymer sack, and the fourth transparent plate.

9. The beam steering system of claim 8, wherein the third and fourth transparent plates are made of glass.

10. The beam steering system of claim 8, wherein the second transparent fluid layer comprises a polydimethylsiloxane fluid having a refractive index ranging from about 1.375 to about 1.390.

11. A method of steering a beam comprising,
    providing a first transparent plate having an inner and a leading surface;
    providing a second transparent plate having an inner and a trailing surface;
    interposing a transparent fluid layer between the inner surface of the first plate and the inner surface of the second plate;
    encapsulating the transparent fluid layer in a transparent polymer sack having a leading periphery and a trailing periphery, the leading and trailing peripheries abut the inner surfaces of the first and second transparent plates, respectively;
    coupling at least one of the first plate and the second plate to at least one piezoelectric actuator to facilitate movement thereof;
    operating the at least one piezoelectric actuator to manipulate the first and second plate relative to each other to create a prism; and
    passing a beam through the first transparent plate, the leading periphery of the transparent polymer sack, the transparent fluid layer, the trailing periphery of the transparent polymer sack, and the second transparent plate to steer the beam.

12. The method of steering a beam of claim 11, wherein the transparent plates are made of glass.

13. The method of steering a beam of claim 11, further comprising using a polydimethylsiloxane fluid, having a refractive index ranging from about 1.375 to about 1.390, as the fluid layer.

14. The method of steering a beam of claim 11, further comprising using three piezoelectric actuators.

15. The method of steering a beam of claim 11, further comprising steering, via the prism, the beam within a conical field of regard by about δ degrees depending on a wedge angle α, a wavelength, and a fluid refractive index.

* * * * *